United States Patent
Langsdorf et al.

(10) Patent No.: US 12,542,491 B2
(45) Date of Patent: Feb. 3, 2026

(54) SWITCHED MODE POWER SUPPLY CHARGER DEVICE, KIT, AND METHODS OF MANUFACTURING AND USING SUCH A POWER SUPPLY DEVICE

(71) Applicant: Braun GmbH, Kronberg (DE)

(72) Inventors: Jan Christian Langsdorf, Oberursel (DE); Jannik Loeper, Hessen (DE); Martin Dietrich, Kronberg (DE)

(73) Assignee: Braun GMBH, Kronberg (DE)

( * ) Notice: Subject to any disclaimer, the term of this patent is extended or adjusted under 35 U.S.C. 154(b) by 263 days.

(21) Appl. No.: 18/212,781

(22) Filed: Jun. 22, 2023

(65) Prior Publication Data

US 2023/0421065 A1    Dec. 28, 2023

(30) Foreign Application Priority Data

Jun. 23, 2022 (EP) .................................... 22180759

(51) Int. Cl.
| | | |
|---|---|---|
| H02M 3/335 | (2006.01) | |
| H02J 7/06 | (2006.01) | |
| H02M 3/00 | (2006.01) | |

(52) U.S. Cl.
CPC ........... *H02M 3/33523* (2013.01); *H02J 7/06* (2013.01); *H02M 3/003* (2021.05)

(58) Field of Classification Search
CPC ......... H02M 3/03; H02M 3/33523; H02J 7/06
USPC .................................................... 363/21.12
See application file for complete search history.

(56) References Cited

U.S. PATENT DOCUMENTS

| | | | |
|---|---|---|---|
| 1,157,026 A | 10/1915 | Meschenmoser | |
| 3,611,261 A | 10/1971 | Gregory | |
| 3,813,638 A | 5/1974 | Kinnear | |
| 4,403,824 A | 9/1983 | Scott | |
| 4,449,776 A | 5/1984 | Carmo et al. | |
| 4,632,121 A | 12/1986 | Johnson et al. | |
| 5,634,829 A | 6/1997 | Kerul | |
| 6,049,192 A * | 4/2000 | Kfoury | H02J 7/0044 320/113 |
| 6,244,882 B1 | 6/2001 | Greenstein | |
| 6,921,281 B2 | 7/2005 | Chen | |
| 7,121,899 B2 | 10/2006 | Homann et al. | |
| 8,152,570 B2 | 4/2012 | Kim et al. | |
| 9,490,599 B2 | 11/2016 | Griffith et al. | |

(Continued)

FOREIGN PATENT DOCUMENTS

| | | |
|---|---|---|
| CN | 108899673 A | 11/2018 |
| DE | 859647 C | 12/1952 |

(Continued)

OTHER PUBLICATIONS

All Office Actions; U.S. Appl. No. 18/215,245, filed Jun. 28, 2023.

(Continued)

*Primary Examiner* — Yemane Mehari
(74) *Attorney, Agent, or Firm* — Gerd Zetterer

(57) ABSTRACT

A switched mode power supply charger device for a personal care appliance comprises a power supply cable and a power plug. The power plug comprises a housing comprising a first compartment and a second compartment adjacent the first compartment. A converter is disposed in the first compartment. A communication circuit is disposed in the second compartment.

20 Claims, 9 Drawing Sheets

(56) References Cited

U.S. PATENT DOCUMENTS

| | | |
|---|---|---|
| 2005/0197018 A1 | 9/2005 | Lord |
| 2010/0186234 A1* | 7/2010 | Binder ................. H04W 84/12 348/E5.022 |
| 2011/0018498 A1 | 1/2011 | Soar |
| 2012/0113645 A1 | 5/2012 | Liao et al. |
| 2012/0171657 A1* | 7/2012 | Ortins .................. A61C 17/221 434/365 |
| 2013/0201316 A1 | 8/2013 | Binder et al. |
| 2015/0249359 A1 | 9/2015 | Gunderson |
| 2015/0380909 A1 | 12/2015 | Chen et al. |
| 2016/0329614 A1 | 11/2016 | Madan et al. |
| 2019/0199031 A1 | 6/2019 | Surana |
| 2019/0242562 A1 | 8/2019 | Chien |
| 2021/0345515 A1* | 11/2021 | Thiel ..................... H01M 50/24 |
| 2022/0324126 A1* | 10/2022 | Loeper ................ B26B 19/3873 |
| 2025/0153380 A1* | 5/2025 | Loeper ................... H05K 1/148 |

FOREIGN PATENT DOCUMENTS

| | | |
|---|---|---|
| EP | 1995827 A2 | 11/2008 |
| EP | 3584889 A1 | 12/2019 |
| WO | 2011015915 A1 | 2/2011 |
| WO | 2011156768 A2 | 12/2011 |
| WO | 2022094657 A1 | 5/2022 |

OTHER PUBLICATIONS

U.S. Appl. No. 18/215,251, filed Jun. 28, 2023, to Gerd Laschinski et. al.
All Office Actions; U.S. Appl. No. 18/212,794, filed Jun. 22, 2023.
All Office Actions; U.S. Appl. No. 18/215,251, filed Jun. 28, 2023.
Anonymous et al: "Philips HC7450/80 User Manual (p. 8 of 118) ManualsLib", XP055982810, URL : https ://www . manualslib. com/manual/1106685/Philips-Hc7450-80 . html?page=8#manual, dated Dec. 22, 2015, 3 pgs.
CM05399FQ Extended EP Search Report and Opinion for 22180759.7 dated Nov. 25, 2022, 10 pages.
CM05399MQ Extended EP Search Report and Opinion for 23181075.5 dated Jul. 9, 2023, 8 pages.
CM05399MQ PCT Search Report and Written Opinion for PCT/IB2023/056462 dated Sep. 7, 2023,13 pages.
U.S. Appl. No. 18/212,794, filed Jun. 22, 2023 to Jan Christian Langsdorf et. al.
U.S. Appl. No. 18/215,245, filed Jun. 28, 2023, to Gerd Laschinski et. al.

* cited by examiner

SWITCHED MODE POWER SUPPLY CHARGER DEVICE, KIT, AND METHODS OF MANUFACTURING AND USING SUCH A POWER SUPPLY DEVICE

FIELD OF THE INVENTION

The invention relates to a switched mode power supply charger device for supplying power to an appliance, in particular a personal care appliance. The invention relates in particular to power supply devices having a communication interface. The invention also relates to kits and systems comprising such a switched mode power supply charger device and to methods of manufacturing and using such a power supply device.

BACKGROUND OF THE INVENTION

Personal care appliances are widely used. Examples for such appliances include hair removal, cutting, or trimming devices (such as shavers, body groomers, epilation devices, etc.) or oral care devices (such as toothbrushes, tongue cleaning devices, or dental shower devices). Many personal care appliances or accessories to be used in association therewith are equipped with electronic components that monitor and record data related to the respective appliance. Some or all of the data may be used for generating an output that is provided via a dedicated user-interface provided on the appliance or on a user terminal that can be communicatively connected to the appliance. Some or all of the data may be used for maintenance or other service-related purposes.

For enhanced user convenience, it would be desirable to provide further improvements in the technical field of communication of appliance-related data, in particular related to personal care appliances.

SUMMARY OF THE INVENTION

It is an object of the invention to provide improved devices, kits, systems, and methods that facilitate the transmission of data collected by an appliance, in particular a personal care appliance. It is in particular an object of the invention to provide devices, kits, systems, and methods that allow appliance-related data to be transmitted over a desired wireless communication standard (such as a member of the IEEE 802.11 standard family) without requiring (while still allowing) the appliance itself to have the required communication circuitry for that specific communication standard. It is also an object of the invention to provide such devices that can be manufactured in an efficient manner.

According to embodiments of the invention, a switched mode power supply charger device that is operative to supply electric power to an appliance and recharge the battery thereof, in particular a personal care appliance, comprises a communication circuit operative to transmit appliance-related data.

The switched mode power supply charger device may comprise a power plug configured for engagement with a mains outlet and having several compartments, with the communication circuit being disposed in one of the compartments.

A switched mode power supply charger device for charging a rechargeable battery of a personal care appliance, the switched mode power supply charger device comprises: a power supply cable having a connector for reversibly releasable engagement with the appliance; a power plug configured for engagement with a mains outlet and comprising: a housing, the housing comprising a first compartment which is sealed against water ingress and a second compartment adjacent the first compartment; wherein the housing comprises a wall separating the first and second compartments, the wall delimiting the second compartment; wherein the wall comprises a passage through which at least one conductor extends from an interior of the first compartment into an interior of the second compartment, the passage being sealed against water ingress into the first compartment; an AC/DC switched mode converter disposed in the first compartment, the converter comprising a converter input and a converter output galvanically separated from the converter input and electrically connected to the power supply cable; and a communication circuit disposed in the second compartment and electrically connected to the converter output, the communication circuit comprising a wireless interface circuit for wireless connection of the switched mode power supply charger device with a wide or local area network.

A switched mode power supply charger device for a personal care appliance in accordance with an embodiment at least comprises: a power supply cable having a connector for reversibly releasable engagement with the appliance; and a power plug configured for engagement with a mains outlet. The power plug comprises a housing, the housing comprising a first compartment and a second compartment adjacent the first compartment. The power plug comprises a converter disposed in the first compartment, the converter comprising a converter input and a converter output galvanically separated from the converter input and electrically connected to the power supply cable. The power plug comprises a communication circuit disposed in the second compartment and electrically connected to the converter output, the communication circuit comprising a wireless interface circuit.

A kit according to an embodiment comprises a personal care appliance and the power supply device.

A method of manufacturing a switched mode power supply charger device for a personal care appliance according to an embodiment comprises providing a power plug component having connector pins for engagement with a mains outlet and a first compartment, wherein the first compartment houses a converter comprising a converter input and a converter output galvanically separated from the converter input, the first compartment being delimited by a wall; arranging a communication circuit on the wall and electrically connecting the communication circuit to the converter output, the communication circuit comprising a wireless interface circuit; affixing an enclosure for the communication circuit to form a second compartment of a power plug; and affixing a power supply cable to the power plug, the power supply cable having a connector for engagement with the appliance.

A use of a switched mode power supply charger device according to an embodiment comprises using the switched mode power supply charger device to provide a communication link over which appliance-related data is transmitted.

Accordingly, the switched mode power supply charger device is made from two compartments, wherein one of them is at least water sealed or protected against water ingress—optionally both are water sealed or water protected. This allows an easy to manufacture set up of a charger with at least dual functionality for charging batteries but also as a data hub for transmitting and collecting data. The wireless module is simple to add to the housing structure of the charger compartment housing by providing a second module/compartment/housing for which provides an add on for the first compartment housing the switched mode converter. The wireless communication circuit benefits from the power supply provided by the module housed in the first compartment and optionally also by the data received via the power supply which is then to be transmitted by the communication circuit. Alternatively, data are also received by the communication circuit.

BRIEF DESCRIPTION OF THE DRAWINGS

Embodiments will be described with reference to the drawings in which identical or corresponding reference signs designate identical or corresponding elements.

DETAILED DESCRIPTION OF THE INVENTION

Figure 1:
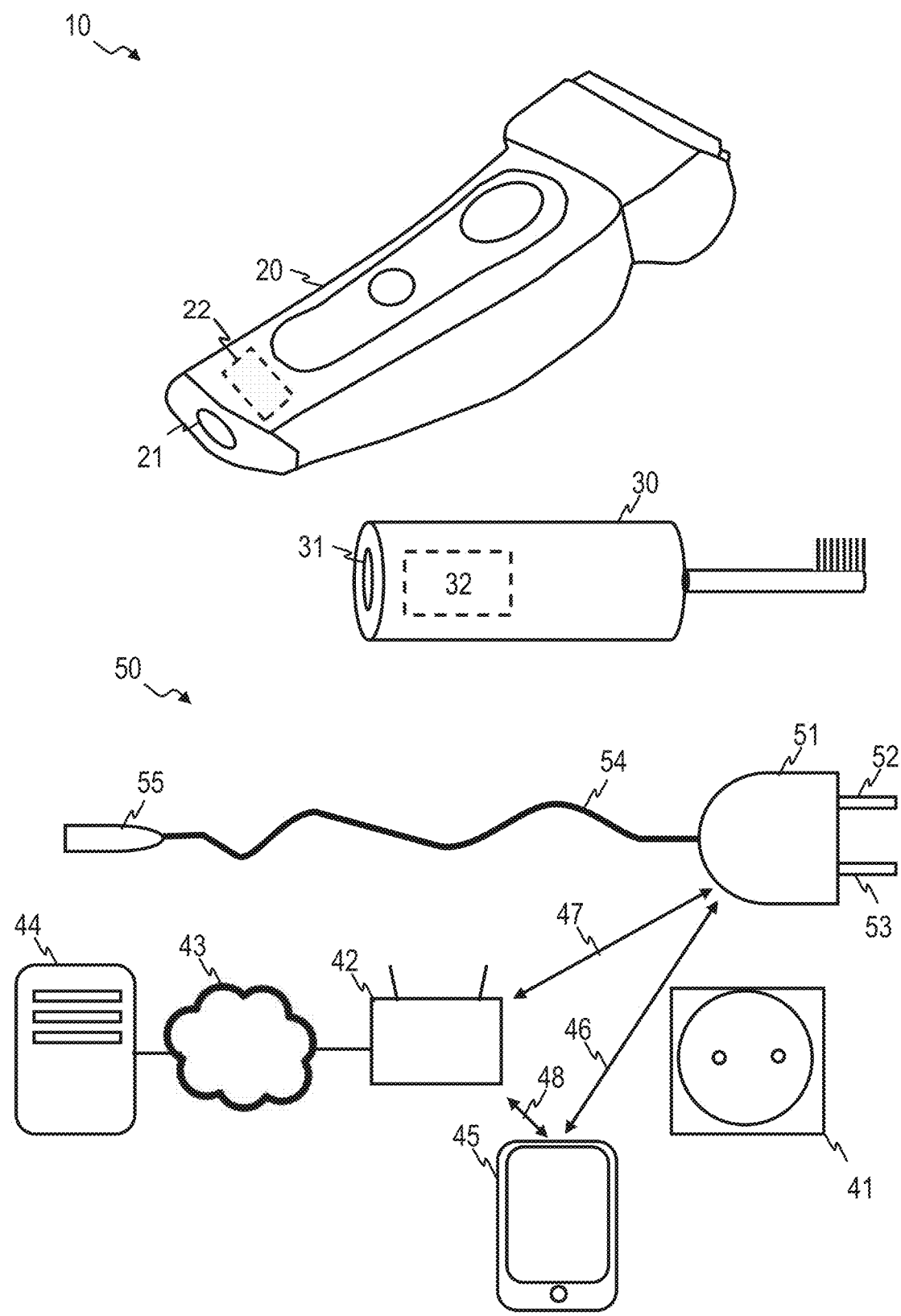
FIG. 1 shows a system comprising a power supply device.

Embodiments will be described with reference to the drawings. Features of embodiments may be combined with each other unless explicitly stated otherwise.

While embodiments will be described in association with power supply devices for personal care appliances, and in association with systems, kits, and methods that may involve personal care appliances, the techniques are not limited thereto. For illustration, the switched mode power supply charger device may be operative for supplying a home appliance with power which may but does not need to be a personal care appliance. Kitchen appliances are examples for such appliances.

Embodiments of the invention relate to power supply devices as well as kits, systems, and methods associated therewith. The switched mode power supply charger device has communication capability. The switched mode power supply charger device is operative to transmit appliance-related data.

As used herein, the phrases "power supply" or "supplying with power" encompasses the provision of electric energy to an appliance for live use of the appliance (e.g., for using the supplied power for driving an electromechanical actuator) and the provision of electric energy to an appliance for charging a battery that may optionally be present.

The communication capabilities of the switched mode power supply charger device may be used not only in association with appliances which the switched mode power supply charger device can supply with electric energy, but also in association with appliances that may require a different type of electric switched mode power supply charger device and/or that may not require any electric power because, e.g., they do not include any electromechanics actuator.

The "appliance-related data" transmitted by the switched mode power supply charger device may be data related to the appliance with which the switched mode power supply charger device is mechanically engaged for providing electric power thereto, data related to an appliance with which the switched mode power supply charger device is mechanically engageable for providing electric power thereto but is not engaged therewith during the data transmission, and/or data related to an appliance with which the switched mode power supply charger device is not mechanically engageable for providing electric power thereto.

A switched mode power supply charger device for an appliance in accordance with an embodiment comprises: a power supply cable having a connector for reversibly releasable engagement with the appliance; and a power plug configured for engagement with a mains outlet. The power plug comprises a housing, the housing comprising a first compartment and a second compartment adjacent the first compartment. The power plug comprises a converter disposed in the first compartment, the converter comprising a converter input and a converter output galvanically separated from the converter input and electrically connected to the power supply cable. The power plug comprises a communication circuit disposed in the second compartment and electrically connected to the converter output, the communication circuit comprising a wireless interface circuit.

Integration of the communication circuit into the switched mode power supply charger device allows the appliance-related data to be transmitted to, e.g., a wide area network (WAN) without requiring (while still allowing) an interface for communication with the WAN to be present in the appliance itself and without requiring the user to communicatively couple a terminal device (such as a cellular telephone, wearable, tablet, or portable or stationary computer) to the appliance for transmission of the appliance-related data.

The two-compartment configuration of the power plug and integration of the communication circuit into the power plug facilitates manufacture. The communication circuit may be mounted externally of the first compartment, in which the power conversion takes place and which supplies power levels that do not present a safety hazard for a user. The first compartment may have a configuration that may also be used without communication circuit, making the production of the power plug including the communication circuit efficient.

The two-compartment configuration of the power plug also aids in recyclability and/or maintenance. For illustration, a communication circuit may continue to be used in association with a different converter when the converter of the switched mode power supply charger device is no longer fully operational. For further illustration, a new communication circuit may be mounted on a switched mode power supply charger device which includes an operational converter when the original communication circuit is no longer fully operational.

The switched mode power supply charger device may be a switched mode power supply charger device for a personal care appliance. This facilitates the use of the switched mode power supply charger device in association with personal care appliances. Users tend to have various personal care appliances for everyday use, and not all (or not even any of them) may be equipped with a desired wireless data communication capability (e.g., communication with a server connected to a WAN). The switched mode power supply charger device affords this communication capability.

The switched mode power supply charger device may be a switched mode power supply charger device for a home appliance, such as a household appliance. This facilitates the use of the switched mode power supply charger device in association with home appliances. Users tend to have various home appliances for everyday use, and not all (or not even any of them) may be equipped with a desired wireless data communication capability (e.g., communication with a server connected to a WAN). The switched mode power supply charger device affords this communication capability.

The first compartment may be sealed against water ingress. The first compartment may have a waterproof rating of, e.g., IPX4, IPX5, IPX6 or greater. The communication circuit may be arranged downstream, along a power transmission path from connector pins for the mains outlet to the appliance, of the converter housed in the first compartment. The second compartment may have a waterproof rating that is less than that of the first compartment, because voltage down-conversion has already happened upstream of the communication circuit.

The first compartment may be water-tight.

The switched mode power supply charger device may be operative to pass electric energy output by the converter through the communication circuit to the power supply cable. This configuration facilitates manufacture of the power supply device. The communication circuit may be added to an autonomous power plug component that provides voltage down-conversion, is sealed against water ingress and, in the power supply device, acts as a first compartment that is integrated, jointly with the communication circuit, into the power supply device.

The connector may comprise electric contacts for abutment on corresponding contacts of an appliance.

The connector may comprise an inductive and/or capacitive power transfer arrangement for contact-free power transfer to an appliance.

The communication circuit may be operative to be powered by power output by the converter. Power used by the communication circuit can be derived from the power passed through it towards the appliance.

The housing may comprise a wall separating the first and second compartments. This configuration facilitates manufacture of the switched mode power supply charger device by providing a mount for the communication circuit.

The housing may comprise an end cap. The end cap and the wall may delimit the second compartment. This configuration facilitates manufacture of the power supply device. The communication circuit and end cap may be added to an autonomous power plug component that provides voltage down-conversion, is sealed against water ingress and, in the power supply device, acts as a first compartment. Thus, only a second compartment needs to be added to the power supply charger device in order to add the wireless functionality. By providing a cap for this second compartment just a module is added the autonomous power plug device and assuring a design based on modularity.

The wall may comprise a passage through which at least one conductor extends from an interior of the first compartment into an interior of the second compartment. The passage may be sealed against water ingress into the first compartment. This configuration facilitates manufacture of the switched mode power supply charger device while ensuring that all components of the device that may be exposed to a mains voltage are sealed against water ingress.

Optionally, the second compartment, e.g. added by a housing cap to the first housing compartment, is less sealed against water ingress.

The power plug may comprise a sealing arrangement that seals the passage against water ingress into the first compartment. This configuration facilitates manufacture of the switched mode power supply charger device while ensuring that all components of the device that may be exposed to a mains voltage are sealed against water ingress.

The power plug may comprise at least one sheath in which the at least one conductor is received and that is integral with or sealingly attached to the wall. This configuration facilitates manufacture of the switched mode power supply charger device while ensuring that all components of the device that may be exposed to a mains voltage are sealed against water ingress.

The communication circuit may comprise a power supply input connected to the at least one conductor. This allow power towards the appliance to be passed through the communication circuit, while powering the communication circuit by the power output from the circuitry housed within the first compartment.

The communication circuit may comprise a power supply output electrically connected to conductors of the power supply cable. This allow power towards the appliance to be passed through the communication circuit, while powering the communication circuit by the power output from the circuitry housed within the first compartment.

The power plug may comprise several connector pins for engagement with the mains outlet, each of the several connector pins extending along a first direction, wherein the wall extends transverse, optionally perpendicular, to the first direction. This allows the communication circuit to be conveniently located towards an end face of the power plug, facilitating the electronic coupling of the communication circuit with a user interface.

The wireless interface circuit may be operative to transmit appliance-related data. Communication of appliance related data towards a computer or server connected to a wide area network (such as the internet) is enabled by the power supply device, without requiring the appliance itself to have a communication interface that enables communication with, e.g., an IEEE 802.11 conformant access point.

The appliance-related data may comprise appliance operation data. The appliance operation data may comprise information on a time, an aggregated time, and/or frequency of use. The appliance operation data may comprise information on parameters (such as voltages, currents, battery capacity, battery charging cycle information, and/or temperature) measured by the appliance. Such information is useful for providing assistance to a user, e.g., by providing information on component wear, suggestions for appliance usage, or other useful user instructions. Such information may also be useful for maintenance purposes.

The appliance-related data may comprise appliance status data. The appliance status data may comprise information on a status of at least one component of the appliance. The appliance status data may include or may be derived from parameters measured by the appliance, such as battery health status, status of a component (such as a foil or cutting blade of a hair cutting device) that is subject to wear in use of the appliance, or other status information indicating a status of the appliance or a component thereof. Such information is useful for providing assistance to a user, e.g., by providing information on component wear, suggestions for appliance usage, or other useful user instructions. Such information may also be useful for maintenance purposes.

The appliance-related data may comprise first appliance-related data related to a first appliance having an appliance connector operative to matingly engage with the connector of the power supply device.

The appliance-related data may comprise second appliance-related data related to a second appliance that does not have an appliance connector operative to matingly engage with the connector of the power supply device.

The second appliance-related data may relate to an appliance that does not have an electromechanical actuator.

Alternatively or additionally, the communication circuit may be operative to receive data and to provide the data, possibly after processing, to one or several personal care appliances, using wired or wireless communication.

The communication circuit may comprise at least one further communication interface circuit different from the wireless interface circuit to collect the appliance-related data. The at least one further communication interface circuit enables the switched mode power supply charger device to collect appliance-related data for transmission over the wireless interface circuit, without requiring the appliance itself to have the respective wireless interface circuit.

The at least one further communication interface circuit may comprise a wired communication circuit. The wired communication circuit may be operative to collect the appliance-related data over first and second conductors of the power supply cable over which power is supplied. Alternatively, or additionally, the at least one further communication interface circuit may comprise a further wireless interface circuit different from the wireless interface circuit. The at least one further communication interface circuit enables the switched mode power supply charger device to collect, via the interface, the appliance-related data for transmission, without requiring (while still allowing) the appliance itself to be operative for data transmission over the wireless interface circuit via which the switched mode power supply charger device transmits the appliance-related data.

The at least one further communication interface circuit may comprise both the wired communication circuit and the further wireless interface circuit different from the wireless interface circuit. Thus, the switched mode power supply charger device may comprise at least three different communication interface circuits, providing versatility in collecting appliance-related data.

The communication circuit may be operative to transmit data received at the wireless interface circuit to the personal care appliance. This allows data for configuring the personal care appliance, firmware or software updates for the personal care appliance, or other data to be provided to the personal care appliance via the power supply device, without requiring the personal care appliance itself to have an interface that allows the appliance to access the repository at which the configuration data, firmware or software updates are stored.

The communication circuit may be operative for one- or bi-directional communication with the personal care appliance.

The one- or bi-directional communication with the personal care appliance may be established via the at least one further communication interface. The bi-directional communication capability may be used to provide, by the power supply device, data for configuring the personal care appliance, update data for the personal care appliance, or other data to the personal care appliance.

The switched mode power supply charger device may comprise a memory. The memory may be arranged in the second compartment. This facilitates temporarily storing the appliance-related data prior to transmission.

The memory may comprise a persistent memory. The persistent memory may have stored therein access information allowing the communication circuit to communicate via an access point and/or to transmit the appliance-related data to a server or computer.

The persistent memory may have stored therein security-related data, with the communication circuit being operative to use the security-related data for data obfuscation, encryption, and/or authentication when transmitting the appliance-related data.

The power plug may comprise a user interface. The user interface may allow information related to the operation of the power supply device, such as its communication status or configuration status, to be output. The user interface may allow the switched mode power supply charger device to be configured for communication with, e.g., an access point. This may be done via communication with a user terminal, which needs to be established selectively only for configuring the access point but not for subsequent transmission of appliance-related data.

The user interface may comprise at least one actuation element for operative to cause the communication circuit to enter a configuration mode. The actuation element may comprise a physical actuation element. The actuation element may comprise a button, which may be a soft button or hard button.

The user interface may comprise at least one status indicator operative to output status information related to the communication circuit, optionally wherein the at least one status indicator may comprise several light segments. The status indicator(s) may comprise one or several light-emitting elements. The status indicator(s) may comprise one or several LEDs. The status indicator(s) may comprise one or several LED-based light segments that may be arranged partially or entirely around a circumference of an end face of the power plug. This allows several status indicators to be integrated on a small area.

The converter may be an AC/DC converter. This facilitates use of the switched mode power supply charger device for deriving an operation power of the appliance from the voltage of a mains outlet.

The converter may be a switched mode power supply (SMPS). This facilitates use of the switched mode power supply charger device for deriving an operation power of the appliance from the voltage of a mains outlet.

A kit may comprise an appliance and the power supply device. The switched mode power supply charger device is operative to transmit appliance-related data via the wireless interface circuit.

The appliance may be a personal care appliance.

The personal care appliance may be selected from a group consisting of a hair cutting, trimming or removal appliance and an oral care appliance (e.g., a dental care appliance).

The appliance may be operative to communicate with the communication circuit of the switched mode power supply charger device using a second communication standard (such as wired communication over conductors of the power supply cable, Bluetooth, or BLE) that is different from a communication standard (such as IEEE 802.11a, b, g, n, ac, ax, and/or ad) supported by the wireless interface circuit of the communication circuit of the power supply device. This allows a less expensive communication chipset to be employed for communication between the appliance and the power supply device, obviating the need to provide a chipset for communication with, e.g., an access point in the appliance.

The appliance may be configured in such a way that it is incapable of communicating in accordance with the communication standard (such as IEEE 802.11a, b, g, n, ac, ax, and/or ad) supported by the wireless interface circuit of the communication circuit of the power supply device. This allows a less expensive communication chipset to be employed for communication between the appliance and the power supply device, obviating the need to provide a chipset for communication with, e.g., an access point in the appliance.

The kit may further comprise an access point of a wireless local area network (WLAN). The communication circuit may be operative to transmit the appliance-related data to a remote computing device via the WLAN access point. This allows the switched mode power supply charger device to operate as a hub that collects, optionally processes and/or aggregates, and then transmits the appliance-related data via the access point.

The kit may further comprise a user terminal. The communication circuit may be operative to receive from the user terminal configuration information for the wireless interface circuit that is required for a subsequent transmission of the appliance-related data to a remote computing device via an access point of a wireless local area network (WLAN).

The communication circuit may be operative to provide the appliance-related data to the user terminal.

The appliance may comprise an appliance connector operative to mechanically engage the connector of the power supply device. This allows the switched mode power supply charger device to transmit appliance-related data for the appliance that can be supplied with power by the power supply device.

The appliance may be configured such that it is incapable of mechanically engaging the connector of the power supply device. This allows the switched mode power supply charger device to transmit appliance-related data for an appliance that may have a different, dedicated power supply and/or that may not require any wired power supply at all.

The kit may comprise both a first appliance and a second appliance, with the switched mode power supply charger device being operative to obtain appliance-related data for both the first appliance and the second appliance for transmission via the wireless interface circuit.

A system according to an embodiment comprises an appliance and the power supply device. The switched mode power supply charger device is operative to transmit appliance-related data via the wireless interface circuit.

The switched mode power supply charger device may be operative to supply the appliance with electric power.

The appliance may be a personal care appliance.

The personal care appliance may be selected from a group consisting of a hair cutting, trimming or removal appliance and an oral care appliance (e.g., a dental care appliance).

The appliance may be operative to communicate with the communication circuit of the switched mode power supply charger device using a second communication standard (such as wired communication over conductors of the power supply cable, Bluetooth, or BLE) that is different from a communication standard (such as IEEE 802.11a, b, g, n, ac, ax, and/or ad) supported by the wireless interface circuit of the communication circuit of the power supply device. This allows a less expensive communication chipset to be employed for communication between the appliance and the power supply device, obviating the need to provide a chipset for communication with, e.g., an access point in the appliance.

The appliance may be configured in such a way that it is incapable of communicating in accordance with the communication standard (such as IEEE 802.11a, b, g, n, ac, ax, and/or ad) supported by the wireless interface circuit of the communication circuit of the power supply device. This allows a less expensive communication chipset to be employed for communication between the appliance and the power supply device, obviating the need to provide a chipset for communication with, e.g., an access point in the appliance.

The appliance may comprise an appliance connector operative to mechanically engage the connector of the power supply device. This allows the switched mode power supply charger device to transmit appliance-related data for the appliance that can be supplied with power by the power supply device.

The appliance may be configured such that it is incapable of mechanically engaging the connector of the power supply device. This allows the switched mode power supply charger device to transmit appliance-related data for an appliance that may have a different, dedicated power supply and/or that may not require any wired power supply at all.

The system may comprise both a first appliance and a second appliance, with the switched mode power supply charger device being operative to obtain appliance-related data for both the first appliance and the second appliance for transmission via the wireless interface circuit.

The system may comprise an access point. The system may comprise a router including the access point. The access point may be a WLAN (e.g., WiFi) access point. The access point may be operative for communication in accordance with at least one of IEEE 802.11a, b, g, n, ac, ax, ad.

The system may comprise a computer or sever. The switched mode power supply charger device may be operative to transmit the appliance-related data to the computer or sever via a WAN to which the access point is coupled.

The system may comprise a user terminal. The user terminal may be a handheld user terminal. The user terminal may be operative to receive, from the computer or server, the appliance-related data or data derived therefrom. This allows the user to conveniently review appliance-related data or data derived therefrom (such as an evaluation of the user's personal care appliance usage and/or information on required or recommended maintenance operations to be performed on the user's personal care appliance(s)) via the user terminal.

The switched mode power supply charger device may be operative to provide the appliance-related data via a communication link directly to the user terminal.

The switched mode power supply charger device may be operative to establish a communication link directly to the user terminal for a configuration of the wireless interface circuit.

The switched mode power supply charger device may be operative to receive, from the user terminal, information on a name and/or key of an access point to which the appliance-related data is to be transmitted. This facilitates a configuration of the switched mode power supply charger device using the user terminal, without requiring the user terminal to be located close to the appliance(s) for transmission of the appliance-related data.

The switched mode power supply charger device may be operative to receive, from the user terminal, information on an identifier and/or passcode for the user that is required to access a user-specific storage area in the server or computer.

The switched mode power supply charger device may be operative to transmit the appliance-related data to the access point without transmitting the appliance-related data to the user terminal.

A method of manufacturing a switched mode power supply charger device for an appliance according to an embodiment comprises providing a power plug component having connector pins for engagement with a mains outlet and a first compartment, wherein the first compartment houses a converter comprising a converter input and a converter output galvanically separated from the converter input, the first compartment being delimited by a wall; arranging a communication circuit on the wall and electrically connecting the communication circuit to the converter output, the communication circuit comprising a wireless interface circuit; affixing an enclosure for the communication circuit to form a second compartment of a power plug; and affixing a power supply cable to the power plug, the power supply cable having a connector for engagement with the appliance.

The method allows the switched mode power supply charger device to be manufactured in an efficient manner. A waterproof power plug component (that may be used as a stand-alone component for appliances that do not require any communication capability) may be combined with a communication circuit arranged externally of the waterproof enclosure of the power plug component.

The switched mode power supply charger device may be a switched mode power supply charger device according to an embodiment.

The enclosure may be an end cap.

Affixing the enclosure may comprise affixing the enclosure by ultrasonic welding or may comprise ultrasonic welding.

The method may further comprise electrically connecting conductors of the power supply cable to a power supply output of the communication circuit.

The method may comprise electrically connecting the output of the converter to a power supply input of the communication circuit.

A use of a switched mode power supply charger device according to an embodiment comprises using the switched mode power supply charger device to provide a communication link over which appliance-related data is transmitted.

The use may comprise transmitting appliance-related data over a wireless interface circuit operative in accordance with at least one of IEEE 802.11a, b, g, n, ac, ax, ad.

The use may comprise interfacing, by the power supply device, an appliance that does not have a wireless interface circuit capable of communicating with an access point (e.g., that does not have an interface in accordance with at least one of IEEE 802.11a, b, g, n, ac, ax, ad) with the access point.

Additional optional features of the manufacturing method and/or use according to embodiments correspond to optional features of the power supply device, kit, or system according to embodiments.

FIG. 1 is a schematic view of a system 10. The system 10 comprises a switched mode power supply charger device 50. The switched mode power supply charger device 50 is operative to transmit, via a wireless interface circuit of the switched mode power supply charger device 50, appliance-related data.

The system 10 comprises one or several appliances 20, 30. The appliance(s) 20, 30 may be home appliances, in particular personal care appliances. The appliance(s) may be or may comprise hair cutting, trimming and/or removal devices and/or oral care devices. The appliance(s) may be selected from a group consisting of an electric shaver, a wet shaver, a body groomer, a hair trimmer, an epilation device, an electric toothbrush, a tongue cleaner, a mouth shower device. The appliance(s) 20, 30 may respectively comprise circuitry that can be communicatively accessed by the switched mode power supply charger device 50, for reading appliance-related data from the appliance(s) 20, 30 by the switched mode power supply charger device 50.

One, several, or all of the appliance(s) 20, 30 may comprise an appliance connector 21, 31 for receiving electric power. At least one of the appliances 20, 30 may be operative to mechanically engage with and receive electric power from the switched mode power supply charger device 50.

The switched mode power supply charger device 50 may be operative to collect appliance-related data from a first appliance with which it is connected to supply electric power thereto and/or a second appliance with which it is not connected. The switched mode power supply charger device 50 comprises a communication circuit operative to transmit the appliance-related data. The switched mode power supply charger device 50 may be operative to transmit the appliance-related data via an interface that accommodates transmission of the appliance-related data to a server 44 or computer 44 connected to a wide area network (WAN) 43, such as the internet. The server 44 or computer 44 may be provided in a cloud. The switched mode power supply charger device 50 may be operative to transmit the appliance-related data over, e.g., a WLAN interface (e.g., in accordance or compatible with IEEE 802.11, such as IEEE 802.11-2012 or IE 802.11-2016).

The appliance-related data may but does not need to be related to the appliance to which power is being supplied by the switched mode power supply charger device 50. The switched mode power supply charger device may be operative to collect and transmit appliance-related data for appliances (such as personal care appliances) that are incapable of being electrically connected to the switched mode power supply charger device 50 for receiving power therefrom, that are presently not electrically connected to the switched mode power supply charger device 50 for receiving power therefrom, and/or that do not need any wired connection to a switched mode power supply charger device 50 for receiving power.

The appliance-related data may include data retrieved by the switched mode power supply charger device 50 from the appliance 20, 30 over a wired or wireless communication channel and/or data collected by the switched mode power supply charger device 50 while it is being connected to the appliance.

Operation and construction of the switched mode power supply charger device 50 will be described in more detail below.

The switched mode power supply charger device 50 comprises a power supply cable 54 having a connector 55 for reversibly releasable engagement with an appliance 20, 30. The switched mode power supply charger device 50 comprises a power plug 51 configured for engagement with a mains outlet 41. The power plug 51 comprises a housing. As will be described in more detail below, the housing may comprise a first compartment housing a converter operative to perform a voltage down-conversion. The housing may comprise a second compartment that is different from the first compartment and in which a communication circuit is arranged. Power supplied to the appliance 20, 30 may be passed through the communication circuit in the second compartment. The first compartment may be sealed against water ingress.

The power plug 51 has connector pins 52, 53 for electrical coupling to a mains by coupling with the mains outlet 41.

The switched mode power supply charger device 50 may operate as follows.

Configuration of the Switched Mode Power Supply Charger Device 50

This is an operational phase that does not need to be performed upon every use. The configuration may be performed only once and/or when access information for an access point 42 changes and/or when access information for user-specific protected storage space in the server or computer 44 changes. The configuration is optional and could be omitted, e.g., when relevant communication data is already provisioned in the switched mode power supply charger device 50 when it is being provided to the user.

In a configuration mode, the communication circuit of the switched mode power supply charger device 50 may receive information required for transmitting appliance-related data to the server or computer 44 via the access point 42. Alternatively or additionally, the communication circuit of the switched mode power supply charger device may receive information required for accessing a user-specific protected storage space in the server or computer 44. This information may be persistently stored in the switched mode power supply charger device 50 and may be accessed when the switched mode power supply charger device 50 transmits appliance-related data.

The switched mode power supply charger device 50 may enter the configuration mode in response to a physical input action performed on an actuation element of the switched mode power supply charger device 50.

The configuration information (which may include a name or other identifier of the access point 42, a key for communication with the access point 42, a user identifier and/or passcode information for accessing a protected user-specific storage connected to a WAN 43) may be received by the switched mode power supply charger device 50 from a user terminal 45. The user terminal 45 may offer an interface that allows a user to enter alphanumeric information for configuring the switched mode power supply charger device 50 for its intended communication towards the access point 42 and, optionally, the server or computer 44. The switched mode power supply charger device 50 may receive the configuration information from the user terminal 45 and may persistently store the configuration information for later use in transmitting the appliance-related data.

Obtaining Appliance-Related Data

During field use of the switched mode power supply charger device 50, the switched mode power supply charger device 50 may obtain appliance-related data. This may comprise receiving information, via a wired or wireless communication link, from the respective appliance 20, 30. Alternatively or additionally, (part of) the appliance-related data may be generated by the power-supply device 50. For illustration, during one or several charging cycles, the switched mode power supply charger device 50 may determine characteristics (such as charging current and voltage) when charging a rechargeable battery 22, 32 in one or several of the appliances 20, 30, which may be useful for establishing information on a battery state (such as battery health).

The appliance-related data may comprise appliance operation data. The appliance operation data may comprise information on a time, an aggregated time, and/or frequency of use. The appliance operation data may comprise information on parameters (such as voltages, currents, battery capacity, battery charging cycle information, and/or temperature) measured by the appliance 20, 30. Such information is useful for providing assistance to a user, e.g., by providing information on component wear, suggestions for appliance usage, or other useful user instructions. Such information may also be useful for maintenance.

Alternatively, or additionally, the appliance-related data may comprise appliance status data. The appliance status data may comprise information on a status of at least one component of the appliance 20, 30. The appliance status data may include or may be derived from parameters measured by the appliance 20, 30, such as status of a component (such as a foil or cutting blade of a hair cutting device) that is subject to wear in use of the appliance, or other status information indicating a status of the appliance 20, 30 or a component thereof. Such information is useful for providing assistance to a user, e.g., by providing information on component wear, suggestions for appliance usage, or other useful user instructions. Such information may also be useful for maintenance purposes.

When the switched mode power supply charger device 50 obtains the appliance-related data, it may use a communication interface that is different from the wireless interface circuit over which the switched mode power supply charger device 50 transmits the appliance-related data. For illustration, the switched mode power supply charger device 50 may have a communication circuit comprising a first communication chipset (e.g., a WiFi communication chip) or other circuit operative to transmit the appliance-related data and a second communication chipset or other circuit (e.g., a Bluetooth, Bluetooth Low Energy (BLE), or wired communication chip) operative to receive data from at least one of the appliance(s) 20, 30.

The appliance-related data may be temporarily stored in the switched mode power supply charger device 50.

Transmitting Appliance-Related Data

During field use of the switched mode power supply charger device 50, the switched mode power supply charger device 50 may transmit the appliance-related data. The switched mode power supply charger device 50 may initiate a transmission of the appliance-related data responsive to a trigger event (such as at least one of: receipt of new appliance-related data, expiry of a timer, connection of the switched mode power supply charger device 50 to a mains outlet 41 and, optionally, an appliance). The switched mode power supply charger device 50 may initiate a transmission of the appliance-related data in time intervals that may be user-configurable, optionally conditionally when the switched mode power supply charger device 50 is engaged with a mains outlet 41 and an appliance.

The transmission of the appliance-related data by the switched mode power supply charger device 50 may be performed when the Transmitting the appliance-related data may comprise selectively establishing, via the communication circuit, a communication connection for transmission the appliance-related data. Configuration information that allows the switched mode power supply charger device to establish a communication link 47 may be retrieved from memory integrated in the power supply device. Transmitting the appliance-related data may comprise selectively transmitting, via the communication circuit, the appliance-related data to the computer or server 44 for storage. Access information that allows a user-specific storage space to be accessed may be retrieved from memory integrated in the power supply device.

The communication circuit of the switched mode power supply charger device may include a wireless interface circuit that allows the appliance-related data to be transmitted via an access point 42 (which may be a WLAN access point, in particular a WiFi access point) and a WAN 43 to a computer or server 44 located remotely from the switched mode power supply charger device 50.

Providing Data to the Appliance

During field use of the switched mode power supply charger device 50, the switched mode power supply charger device 50 may optionally be operative to provide data received via the access point 42 or directly from the user terminal 45 to one or several appliances. The switched mode power supply charger device 50 may be operative to provide data for configuring the appliance, firmware or software updates for the personal care appliance, or other data to the appliance(s), without requiring the appliance(s) to have an interface that allows the appliance(s) to access the repository at which the data for configuring the appliance, firmware or software updates for the personal care appliance or other data that are to be transmitted to the appliance are stored or received.

In one example, a computer or server 44 may provide a software or firmware update to an appliance (such as a personal care appliance), with the switched mode power supply charger device 50 passing the data on to the appliance.

In another example, a user terminal 45 may provide data for configuring an appliance (such as a personal care appliance), with the switched mode power supply charger device 50 passing the data on to the appliance.

Accessing Appliance-Related Data

Appliance-related data and/or additional information generated therefrom may be accessed by the user using a user terminal 45 (that may but does not need to be the same as the user terminal used when the switched mode power supply charger device 50 is configured for transmitting data via, e.g., the access point 42). The user terminal 45 may access the appliance-related data to, e.g., review his/her usage of the appliance(s) 20, 30 (such as the time spent for shaving and/or brushing his/her teeth) based on the appliance-related data, receive suggestions related to his/her usage of the appliance(s) 20, 30 (such as suggestions for modifying the operation mode of an appliance) based on the appliance-related data, receive advice on recommended maintenance operations (such as replacement of a replaceable component; a cutting blade or shaver foil or toothbrush implement are examples) based on the appliance-related data, and/or receive advice on maintenance operations that should be performed by qualified personnel (such as replacement of a battery) based on the appliance-related data.

The user terminal 45 may access the appliance-related data via a server or computer 44 using a communication link 48 or using a direct communication link 46 with the wireless interface circuit of the switched mode power supply charger device 50. The switched mode power supply charger device 50 may be operative to provide the appliance-related data to the user terminal 45 (e.g., via a direct wireless communication link 46 between the switched mode power supply charger device 50 and the user terminal 45).

Accessing the appliance-related data via a user terminal is not required. For illustration, the appliance-related data may be accessed selectively by service personnel when performing maintenance operations on the appliances.

The methods disclosed herein may respectively comprise using the transmitted appliance-related data for maintenance and service purposes of the appliance(s).

Figure 2:
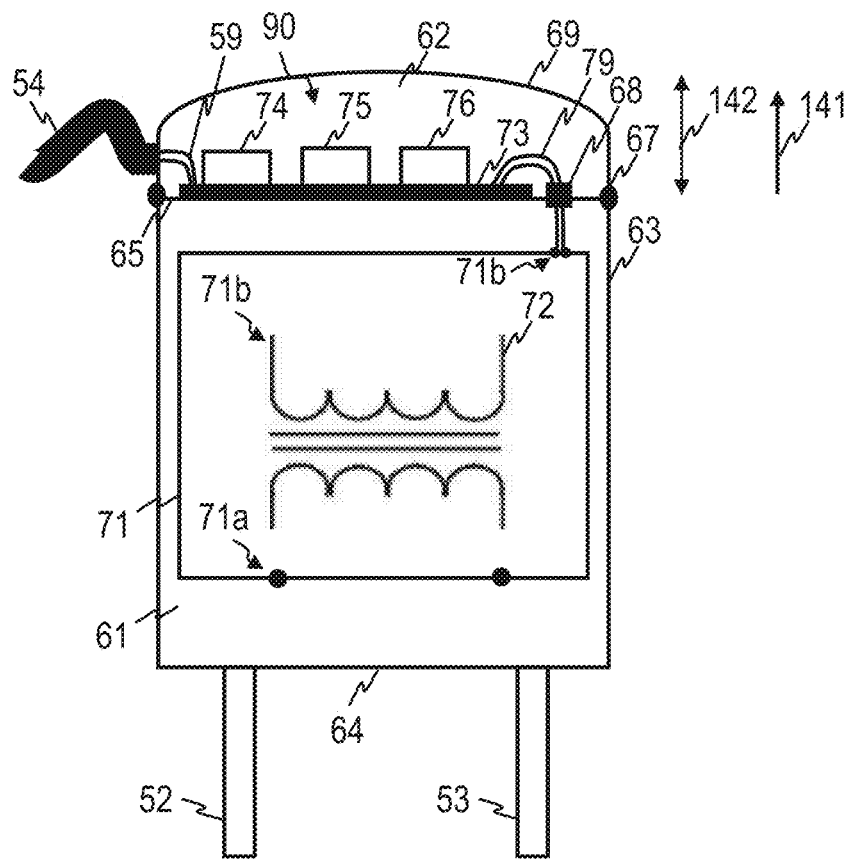
FIG. 2 shows a power supply device.

FIG. 2 is a schematic partial view of the power supply device, showing the power plug 51 in more detail. The power plug 51 comprise a first compartment 61 and a second compartment 62 separated by a wall 65.

The first compartment 61 houses a converter 71. The converter 71 may comprise a transformer 72. converter 71 may be operative to perform a voltage down conversion. The converter 71 includes a galvanic separation. The converter 71 has a converter input 71a and a converter output 71b galvanically separated from the converter input 71a.

The converter 71 may be an AC/DC converter. The converter 71 may be a switched mode power supply (SMPS).

The first compartment 61 is surrounded and delimited by an enclosure 63. The enclosure 63 may provide waterproof characteristics according to at least IPX4 or greater (determined in accordance with, e.g., ISO 20653, DIN 40050-9, or IEC 60529). The wall 65 may be comprised by the compartment enclosure 63. The wall 65 may be integral with side walls extending between the wall and an end wall 64 from which the connection pins 52, 53 project. The wall 65 may be transverse, in particular perpendicular to, a direction 141 along which the connection pins 52, 53 extend.

The enclosure 63 that surrounds the first compartment 61 may be waterproof. For illustration, the enclosure 63 may comply with IPX4 or higher (determined in accordance with, e.g., ISO 20653, DIN 40050-9, or IEC 60529). A sealing arrangement 68 may be provided at a passage through which conductors 79 pass from the first compartment 61 through the wall 65. The sealing arrangement may be or may comprise a molding material 68 that is applied to prevent water ingress into the first compartment 61.

The second compartment 62 houses a communication circuit 90. As used herein, the term "communication circuit" does not preclude the communication circuit to fulfil functions other than providing a communication functionality, provided that the communication circuit provides at least some communication functionality that allows appliance-related data to be transmitted via a wireless interface circuit. As will be described in more detail below, the communication circuit may be operative to pass power to an appliance for operating or charging the appliance and/or to control a user interface provided on the power plug.

The communication circuit 90 may comprise one or several integrated circuits (ICs). The integrated circuits may be or may comprise one or several of an application specific integrated circuit (ASIC), a processor, a controller, a field-programmable gate array (FPGA), or combinations thereof. The ICs may comprise a communication chip or chipset for communication in accordance with an IEEE 802.11 standard (e.g., in conformity with IEEE 802.11-2012 or 802.11-2016), at least one further communication chip or chipset different from the IEEE 802.11 chip or chipset, and an IC that controls operation of the communication circuit, including performing data retrieval and/or transmitting functions and, optionally, control functions for a user interface.

The communication circuit 90 may comprise at least one wireless interface circuit for transmitting appliance-related data. The communication circuit 90 may optionally comprise one or several additional data interfaces for obtaining the appliance-related data. Alternatively, the same wireless interface circuit may be used for obtaining and transmitting appliance-related data.

The communication circuit 90 may comprise a first chip or chipset 74 that provides a wireless interface circuit for transmitting appliance-related data. The communication circuit 90 may comprise one or more additional chips or chipsets 75, 76 that provide a wired or wireless interface circuit, allowing the communication circuit to receive data from one or several appliances. The communication circuit 90 may comprise at least one IC that may be operative to coordinate and control operation of the communication circuit 90.

The communication circuit 90 may comprise a circuit board 73. One or several ICs that include or provide wireless or wired communication interfaces may be mounted on the circuit board 73. Additional components, such as a circuit for powering the IC(s) using power supplied by the converter 71, may also be mounted on the circuit board 73.

The circuit board 73 may be affixed on the wall 65. The circuit board 73 may be affixed on the wall 65 using any suitable fixation mechanism. The circuit board 73 may be affixed on the wall 65 using adhesive, without being limited thereto.

The communication circuit 90 may comprise a power supply input connected to an output of the converter 71. The communication circuit 90 may comprise a power supply output connected to conductors 79 that extend through the cable 54 to electrical contacts in the connector 55. The communication circuit 90 may comprise a power supply output connected to conductors 59 of the power supply cable 54.

When the connector 55 is engaged with an appliance and the power plug 51 is engaged with the mains outlet 41, power may pass through the communication circuit 90 from the converter 71 to the appliance.

The second compartment 62 is delimited by an end cap 69 that may be engaged with the enclosure 63, e.g., at the wall 65. The connection between the end cap 69 and the enclosure 63 may but does not need to be waterproof. The second compartment 62 may have an IPX rating (determined in accordance with, e.g., ISO 20653, DIN 40050-9, or IEC 60529) that is less than that of the first compartment 61. The end cap 69 may be affixed by an ultrasonic weld 67, adhesive, or other affixing means.

The second compartment 62 may have a height 142, measured along direction 141 from the surface of the wall 65 to the point on the exterior surface of the end cap 69 that has the greatest distance from a plane defined by the surface of the wall 65 that faces away from the converter 71. The height 142 may be less than 1 cm, less than 0.9 cm, less than 0.8 cm, less than 0.7 cm, less than 0.6 cm, or less than 0.5 cm.

Figure 3:
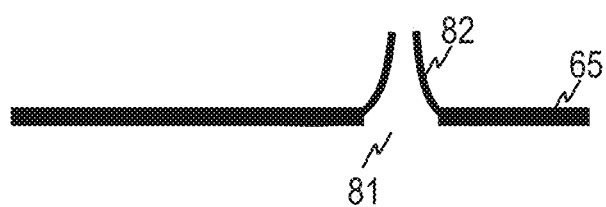
FIG. 3 is a detail view of a power supply device.

The sealing arrangement 68 may be implemented in various forms. FIG. 3 shows an implementation in which the wall 65 includes a passage 81 through which at least one conductor 79 passes from the first compartment 61 to the second compartment 62. A sheath 82 may be affixed to or integrally formed with the wall 65 and may extend into the second compartment 62. The sheath 82 may form as a conduit in which conductors received in their respective conductor sheaths may be received in tight abutment. The sheath 82 may have resiliency to sealing act on the conductors in their conductor sheaths in a sealing manner. Alternatively, or additionally, the sealing arrangement may be formed by a molding material 68 that is applied to seal the passage 81 against water ingress.

Figure 4:
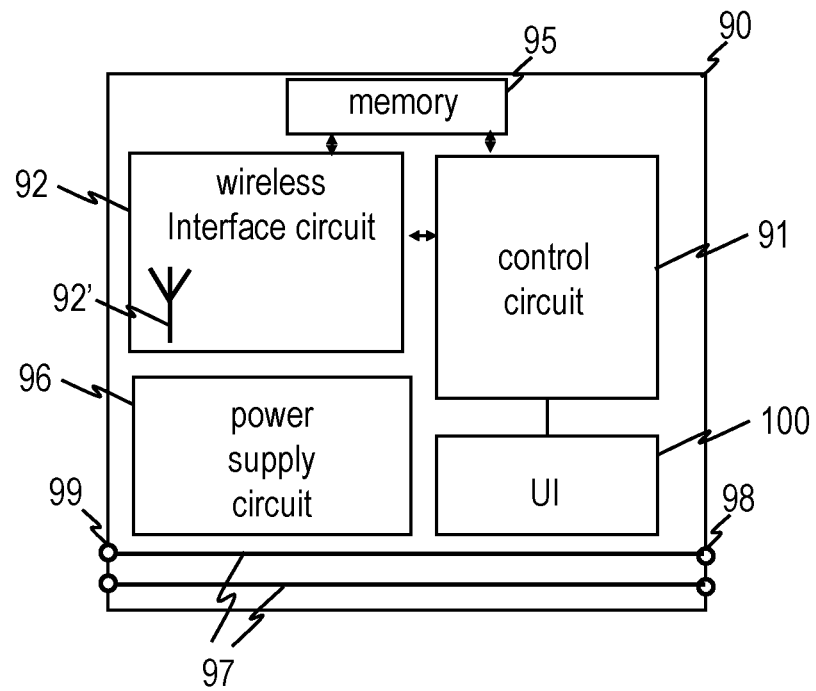
FIG. 4 is a block diagram of a communication circuit of the power supply device.

FIG. 4 is a functional block diagram of a communication circuit 90. The communication circuit 90 may be comprised by the switched mode power supply charger device 50 of FIGS. 1 and 2.

The communication circuit 90 comprises a wireless interface circuit 92. The wireless interface circuit 92 may be operative for transmitting appliance-related data via a WLAN (e.g., WiFi) access point. The wireless interface 92 may be operative for transmitting appliance-related data via a WLAN access point to a server or computer 44 connected to a WAN 44.

The wireless interface circuit 92 may comprise an antenna 92'. The antenna 92' may be operative for transmitting, and optionally for receiving, in the 5 GHz and/or 2.4 GHz bands. The wireless interface circuit 92 may be a communication chip or chipset for communication in accordance with an IEEE 802.11 standard (e.g., in conformity with IEEE 802.11-2012 or 802.11-19.

The communication circuit 90 may comprise a control circuit 91. The control circuit 91 may be operative to control data transmission via the wireless interface circuit 92. The control circuit 91 may be operative to control storing of obtained appliance-related data in a memory 95. The control circuit 91 may be operative to control output of stored appliance-related data from memory 95 for transmission via the wireless interface circuit 92.

The memory 95 may be a non-volatile memory. The memory 95 may be operative for storing appliance-related data even in time periods in which the power plug 51 is not engaged with a mains outlet 41.

The communication circuit 90 may have a power supply input 98 and a power supply output 97. The power supply input 98 may be connected to an output of the converter 71 to receive power therefrom. The power supply input 98 may be coupled to a low-voltage side of the converter 71.

The communication circuit 90 may have a power supply output 99. The power supply output 99 may be electrically connected to conductors extending in power supply cable 54.

The communication circuit 90 may have conductors 97 that interconnect the power supply input 98 and the power supply output. The conductors 97 may be implemented as conductive traces. In operation of the power supply device, power is passed by the conductors 97 from the converter 71 to the appliance engaged with the connector 55.

The communication circuit 90 may comprise a power supply circuit 96. the power supply circuit 96 may be connected to the conductors 97 or may otherwise be connected to the power supply input 98. The power supply circuit 96 may be operative to provide a supply power for the wireless interface circuit 92, the control circuit 91, and, if present, a user interface 100.

The communication circuit 90 may comprise a user interface (UI) 100. The user interface 100 may be operative to output status information on the communication circuit 90. The user interface 100 may be operative to receive a user input that causes the communication circuit 90 to enter a configuration procedure that allows the communication circuit 90 to be configured for communication with, e.g., the access point 42 and/or computer or server 44. In response to actuation of an actuation element of the UI 100, the communication circuit 90 may establish a communication link to a programming device (such as the terminal 45) distinct from the power supply device, which allows at least one of parameters, addresses, keys, and/or identifiers to be configured, which allow(s) the communication circuit 90 to transmit appliance-related data to the access point 42 and/or computer or server 44.

Figure 5:
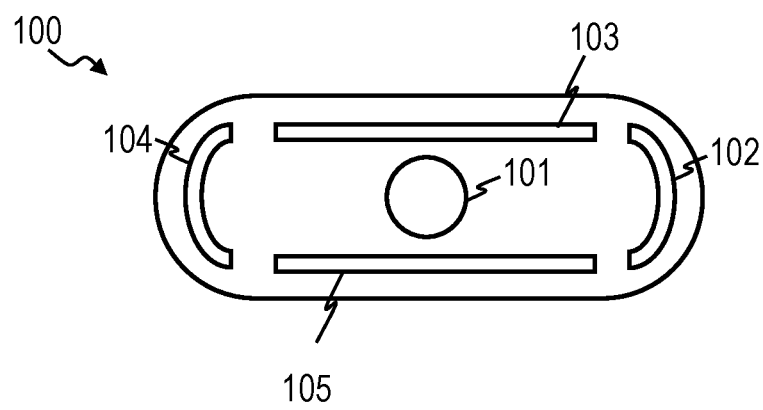
FIG. 5 is a plan view of the power supply device.

FIG. 5 is a schematic view of an implementation of a UI 100. The UI 100 may comprise at least one status indicator 102-105 operative to output status information related to the communication circuit 90. The at least one status indicator may comprise several light segments 102-105. The status indicator(s) may comprise one or several light-emitting elements 102-105. The status indicator(s) may comprise one or several LEDs 102-105. The status indicator(s) may comprise one or several LED-based light segments 102-105 that may be arranged partially or entirely around a circumference of an end face of the power plug 51, which may be opposite to the end face 64 from which the connector pins 52, 54 project. This allows several status indicators 102-105 to be integrated on a small area.

The UI 100 may comprise at least one actuation element 101 for operative to cause the communication circuit to enter a configuration mode 92. The actuation element 101 may comprise a physical actuation element. The actuation element 101 may comprise a button, which may be a soft button or hard button. The actuation element 101 may comprise a button arranged centrally in an area having a plurality (e.g., two, three, or more) of status indicators 102-105 arranged on its periphery.

The switched mode power supply charger device may be operative such that the control circuit 91 selectively activates one or several of the status indicators 102-105. The status indicators may be activated continually or in an intermittent manner (e.g., blinking) to provide status information, using the area available on the power plug. The control circuit 91 may be operative to activate one or several of the status indicators to indicate one or more of the following:

the switched mode power supply charger device is in a configuration mode in which it is operative to be configured for communication with the access point 42 and/or computer or server 44;

the switched mode power supply charger device is in the process of establishing a communication link with the access point 42 and/or computer or server 44;

the switched mode power supply charger device has established a communication link with the access point 42 and/or computer or server 44;

the switched mode power supply charger device captures appliance-related data (which may be implemented via the wireless interface circuit 92 or a communication interface different from the wireless interface circuit 92);

the switched mode power supply charger device transmits appliance-related data.

One and the same indicator 102-105 may be operated differently to indicate different statuses. For illustration, one and the same indicator 102-105 may be operated in two different modes (blinking mode and continuous mode) to indicate two different states. For illustration, one of the status indicators may be operated in blinking mode to indicate that the switched mode power supply charger device is in the process of establishing a communication link with the access point 42 and/or computer or server 44, and in continuous mode to indicate that the switched mode power supply charger device has established a communication link with the access point 42 and/or computer or server 44.

The switched mode power supply charger device may capture appliance-related data from one or several appliance(s) (and not necessarily limited to an appliance which is being supplied with power). The switched mode power supply charger device may capture appliance-related data using the wireless interface 92. Alternatively, or additionally, the switched mode power supply charger device may include one or several additional communication interface circuits for capturing the appliance-related data.

Figure 6:
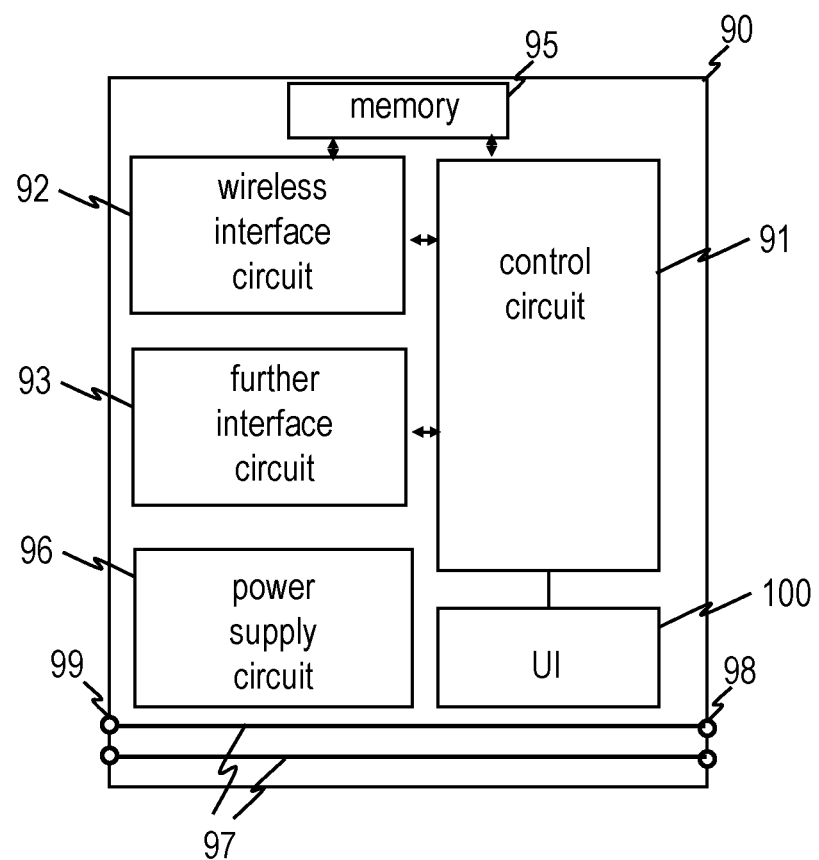
FIG. 6 is a block diagram of a communication circuit of the power supply device.

FIG. 6 is a block diagram of a communication circuit 90 that may be used in a switched mode power supply charger device according to an embodiment. The communication circuit 90 comprises the wireless interface circuit 92 and, in addition, may comprise a further interface circuit 93. The wireless interface circuit 92 and further interface circuit 93 may be operative to provide communication capabilities that use different data carriers (e.g., different frequencies and/or different media, such as wired and wireless). The wireless interface circuit 92 may be operative for providing communication with the access point 42. The wireless interface circuit 92 may be operative for providing one- or bi-directional communication with the access point 42 that allows appliance-related data to be transmitted to the computer or server 44.

The further interface circuit 93 may be incapable of establishing communication link with the access point 42. The further interface circuit 93 may be operative to communicate with one or several appliances for obtaining, by the power supply device, the appliance-related data.

The further interface circuit 93 may but does not need to be implemented as a wireless communication circuit. More than one further interface circuit 93 may be provided, with at least one of the further interface circuit(s) 93 being a wireless communication circuit operative in accordance with a communication protocol different from that used by the wireless interface circuit 92. The switched mode power supply charger device may comprise both at least one further interface circuit(s) 93 that is a wireless communication circuit operative in accordance with a communication protocol different from that used by the wireless interface circuit 92 and a wired communication circuit operative to collect appliance related data via the conductors via which power is supplied to the appliance in field use.

The further interface circuit 93 may be operative for receiving data from a programming device, such as the terminal device 45, which provides access information for communication with the access point 42 and/or computer or server 44. For illustration, when the switched mode power supply charger device is set into a configuration mode (e.g., by actuation of the actuation element 101), the further interface circuit 93 may receive access information for the access point 42 (such as a name of a WLAN and a key) and/or for a protected storage area in the computer or server 44 (such as an identifier and/or passcode for a user-specific data repository region) from the terminal device 45 or another device that is selectively communicatively coupled with the communication circuit 90 for configuring the same.

The communication circuit 90 may be operative to store the obtained appliance-related data in memory 95. The communication circuit 90 may optionally be operative to process data obtained from one or several appliances prior to their transmission as appliance-related data. For illustration, the communication circuit 90 may be operative to aggregate data collected from one and the same appliance over an extended time period prior to the transmission as appliance-related data.

The communication circuit 90 may be operative to store the access information for the access point 42 (such as a name of a WLAN and a key) and/or for a protected storage area in the computer or server 44 (such as an identifier and/or passcode for a user-specific data repository region) in memory 95 for later use in transmitting the appliance-related data.

The wireless interface circuit 92 and the further interface circuit 93 may be implemented by different ICs, e.g. by different chips or chipsets.

Figure 7:
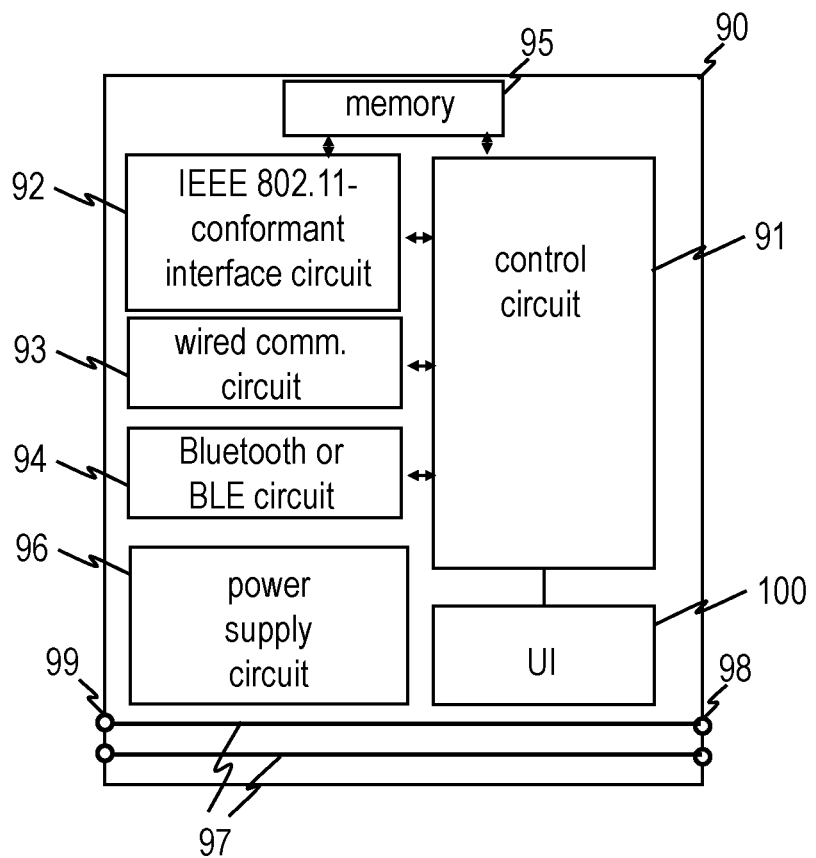
FIG. 7 is a block diagram of a communication circuit of the power supply device.

FIG. 7 is a block diagram of a communication circuit 90 that may be used in a switched mode power supply charger device according to an embodiment. The communication circuit 90 comprises the wireless interface circuit 92 a first further interface circuit 93, and a second further interface circuit 94. The wireless interface circuit 92, the first further interface circuit 93, and the second further interface circuit 94 may be operative to provide communication capabilities that use different data carriers (e.g., different frequencies and/or different media, such as wired and wireless). The wireless interface circuit 92 may be operative for providing communication with the access point 42. The wireless interface circuit 92 may be operative for providing one- or bi-directional communication with the access point 42 that allows appliance-related data to be transmitted to the computer or server 44.

The first further interface circuit 93 and the second further interface circuit 94 may be incapable of establishing communication link with the access point 42. The first further interface circuit 93 and the second further interface circuit 94 may be operative to communicate with one or several appliances for obtaining, by the power supply device, the appliance-related data. The first further interface circuit 93 and the second further interface circuit 94 may be complementary in the sense that one uses a wired communication technique (such as communication over the conductors in the power supply cable via which power is supplied to an appliance in field use) and the other uses a wireless communication technique (such as Bluetooth, Bluetooth Low Energy (BLE), or a machine-to-machine (M2M) communication protocol supported by a cellular standard, such as LTE or LTE-A).

In one implementation, the wireless interface circuit 92 may be operative to transmit data via a communication link with the access point 42 in accordance with an IEEE 802.11 (e.g., 802.11-12 or 802.11-19) conformant technique. The first further interface circuit 93 may be operative to obtain appliance-related data by reading data from an appliance using communication via the conductors in the power supply cable via which power is supplied to an appliance in field use. The second further interface circuit 94 may be operative to obtain appliance-related data by reading data from an appliance using a wireless communication technique different from IEEE 802.11 (such as Bluetooth, Bluetooth Low Energy (BLE), or a machine-to-machine (M2M) communication protocol supported by a cellular standard, such as LTE or LTE-A).

The first further interface circuit 93 may be operative for receiving data from a programming device, such as the terminal device 45, which provides access information for communication with the access point 42 and/or computer or server 44. For illustration, when the switched mode power supply charger device is set into a configuration mode (e.g., by actuation of the actuation element 101), the further interface circuit 93 may receive access information for the access point 42 (such as a name of a WLAN and a key) and/or for a protected storage area in the computer or server 44 (such as an identifier and/or passcode for a user-specific data repository region) from the terminal device 45 or another device that is selectively communicatively coupled with the communication circuit 90 for configuring the same.

Figure 8:
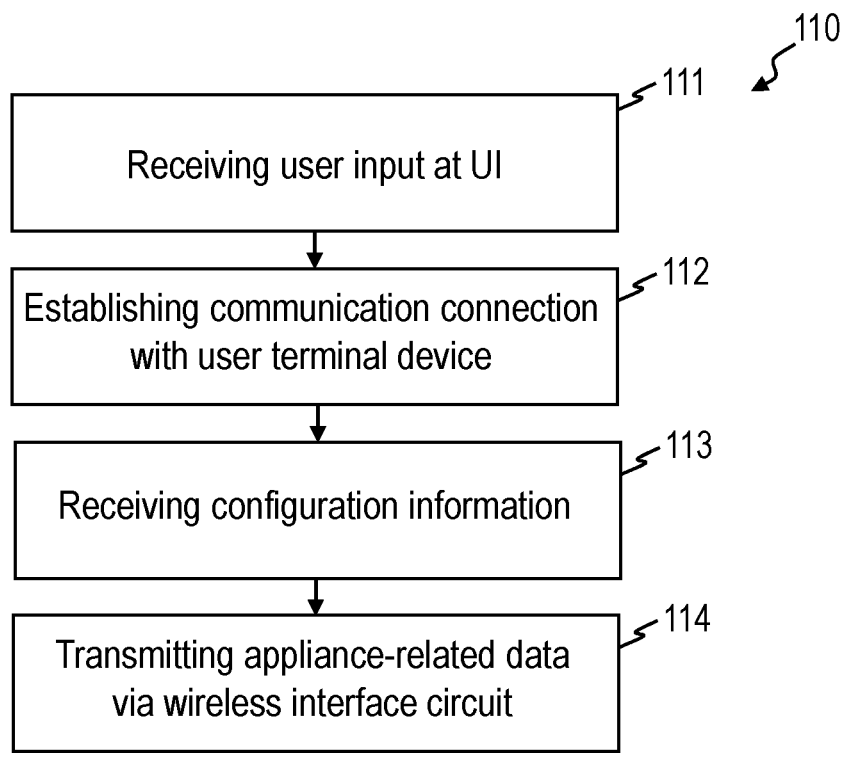
FIG. 8 is a flow chart of an operation method of the power supply device.

FIG. 8 is a flow chart of a method 110 that may be used to configure the switched mode power supply charger device for transmitting appliance-related data. Steps 111-113 of the method 110 may need to be performed selectively only when any one of the following happens: (i) an initial configuration of the switched mode power supply charger device by the user; (ii) the name and/or key of the access point 42 changes; optionally (iii) the user's identifier and/or passcode on the computer or server 44 changes.

At step 111, a user input is received at the UI 100 of the power supply device. The user input may be an actuation of a button. The user input may cause the communication circuit 90 to enter a configuration mode.

At step 112, the communication circuit 90 establishes a communication connection with a user terminal device 45. The communication connection with the user terminal device 45 may be established using an interface circuit (e.g., a Bluetooth or BLE chip) of the communication circuit 90 that is different from the interface circuit of the communication circuit 90 that is used for transmitting appliance-related data.

At step 113, configuration information is received by the switched mode power supply charger device from the user terminal device 45 via the communication link established at step 112. The configuration information may comprise access information for the access point 42 (such as a name of a WLAN and a key) and/or for a protected storage area in the computer or server 44 (such as an identifier and/or passcode for a user-specific data repository region). The configuration information may be stored persistently in memory 95 for subsequent use.

At step 114, the switched mode power supply charger device may transmit appliance-related data via a wireless interface circuit (e.g., in accordance with IEEE 802.11). The appliance-related data may include appliance-related data obtained prior to the configuration at steps 111-113 when the appliance-related data is determined by monitoring performed by the switched mode power supply charger device itself (as may be the case for battery health information) and/or when the appliance-related data is obtained over a wired or wireless interface different from that that is configured at steps 111-113. The appliance-related data may include appliance-related data obtained subsequent to the configuration at steps 111-113.

The appliance-related data transmitted at step 114 may comprise appliance operation data. The appliance operation data may comprise information on a time, an aggregated time, and/or frequency of use. The appliance operation data may comprise information on parameters (such as voltages, currents, battery capacity, battery charging cycle information, and/or temperature) measured by the appliance. Such information is useful for providing assistance to a user, e.g., by providing information on component wear, suggestions for appliance usage, or other useful user instructions. Such information may also be useful for maintenance purposes.

The appliance-related data transmitted at step 114 may comprise appliance status data. The appliance status data may comprise information on a status of at least one component of the appliance. The appliance status data may include or may be derived from parameters measured by the appliance, such as battery health status, status of a component (such as a foil or cutting blade of a hair cutting device) that is subject to wear in use of the appliance, or other status information indicating a status of the appliance or a component thereof. Such information is useful for providing assistance to a user, e.g., by providing information on component wear, suggestions for appliance usage, or other useful user instructions. Such information may also be useful for maintenance purposes. The appliance-related data may comprise first appliance-related data related to one or several appliances having an appliance connector operative to matingly engage with the connector of the power supply device. The appliance-related data may comprise second appliance-related data related to one or several other appliances that do not have an appliance connector operative to matingly engage with the connector of the power supply device. The switched mode power supply charger device may, thus, operate as a data aggregation and transmission hub for collecting and transmitting appliance-related data for various appliances (such as various personal care or other home appliances) without requiring the user's cellphone or computer to be involved in the data collection and transmission. The user's cellphone or computer may be used selectively only for configuring the switched mode power supply charger device for the respective home network and/or user.

Step 114 may be repeated. Repetitions of step 114 may be triggered by a trigger event. The trigger event may be or may include engagement of the switched mode power supply charger device with a mains outlet and/or appliance, expiry of a timer, or other criteria that may be stored persistently in the switched mode power supply charger device or that may be configurable at steps 111-113.

FIG. 8 is a flow chart of a method 120 that may be performed by the power supply device.

At step 121, the switched mode power supply charger device may supply power to a first appliance.

At step 122, the switched mode power supply charger device obtains appliance-related data. The appliance-related data may be related to the first appliance that is currently being supplied with power. Alternatively, or additionally, the appliance-related data may be related to one or several second appliances that are currently not being supplied with power by the power supply device. Communication between the second appliance(s) and the communication circuit 90 may be enabled by batteries of the second appliance(s).

The appliance-related data obtained at step 122 may comprise appliance operation data. The appliance operation data may comprise information on a time, an aggregated time, and/or frequency of use of the respective first and/or second appliance(s). The appliance operation data may comprise information on parameters (such as voltages, currents, battery capacity, battery charging cycle information, and/or temperature) measured by the respective first and/or second appliance(s), optionally buffered in the respective first and/or second appliance(s) and read by the switched mode power supply charger device at step 122.

The appliance-related data obtained at step 122 may comprise appliance status data. The appliance status data may comprise information on a status of at least one component of the respective first and/or second appliance(s). The appliance status data may include or may be derived from parameters measured by the appliance, such as battery health status, status of a component (such as a foil or cutting blade of a hair cutting device) that is subject to wear in use of the respective first and/or second appliance(s), or other status information indicating a status of the appliance or a component thereof. Part or all of the data may be measured by the respective first and/or second appliance(s), optionally buffered in the respective first and/or second appliance(s), and read by the switched mode power supply charger device at step 122. Part or all of the data may be obtained by the switched mode power supply charger device (e.g., by deriving battery health information from charging currents and/or voltages during a charging or battery calibration cycle).

At step 123, the appliance-related data may be transmitted by the power supply device. The switched mode power supply charger device may transmit the appliance-related data for one or several appliances (such as various personal care or other home appliances) without requiring the user's cellphone or computer to be involved in the data collection and transmission.

Figure 9:
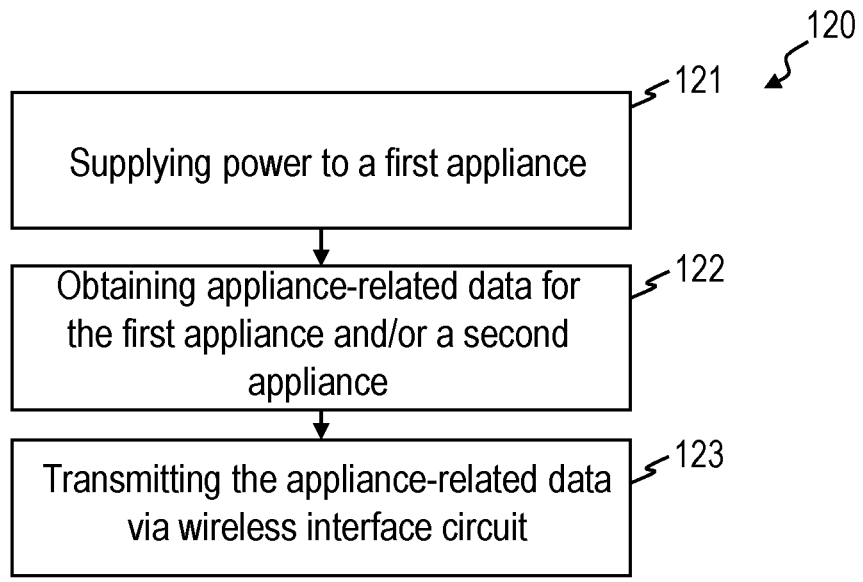
FIG. 9 is a flow chart of an operation method of the power supply device.
Figure 10:
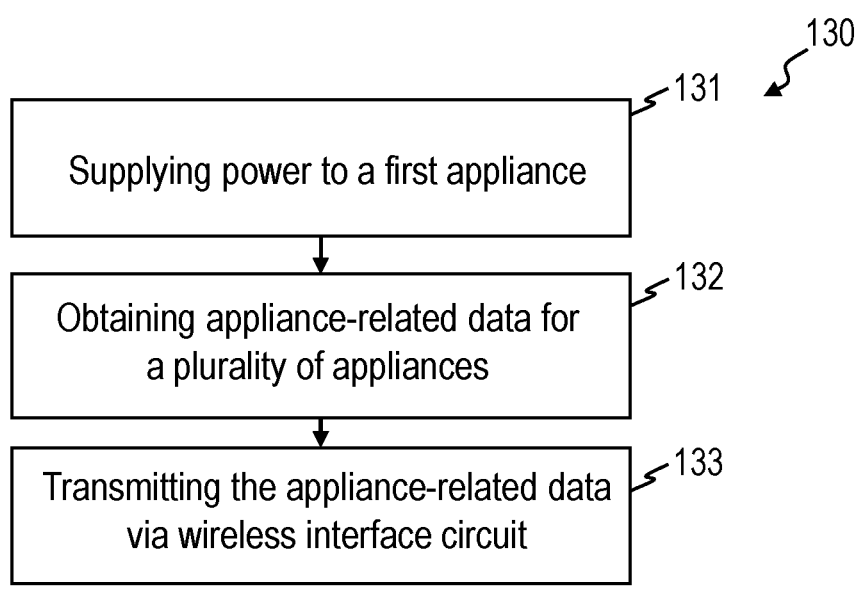
FIG. 10 is a flow chart of an operation method of the power supply device.

FIG. 9 is a flow chart of a method 130 that may be performed by the power supply device.

At step 131, the switched mode power supply charger device may supply power to a first appliance.

At step 132, the switched mode power supply charger device obtains appliance-related data for a plurality of appliances. The plurality of appliances may but does not need to include the first appliance. The plurality of appliances may include one or several appliances that may be engageable with the appliance connector of the power supply device. The plurality of appliances may include one or several appliances that are not engageable with the appliance connector of the power supply device. The plurality of appliances may include one or several appliances that include an electromechanical actuator. The plurality of appliances may include one or several appliances that do not include an electromechanical actuator but include monitoring circuitry for monitoring use of the respective appliance.

The appliance-related data obtained at step 132 may comprise appliance operation data or appliance status data, as explained above.

At step 133, the appliance-related data may be transmitted by the power supply device. The switched mode power supply charger device may transmit the appliance-related data for one or several appliances (such as various personal care or other home appliances) without requiring the user's cellphone or computer to be involved in the data collection and transmission.

Figure 11:
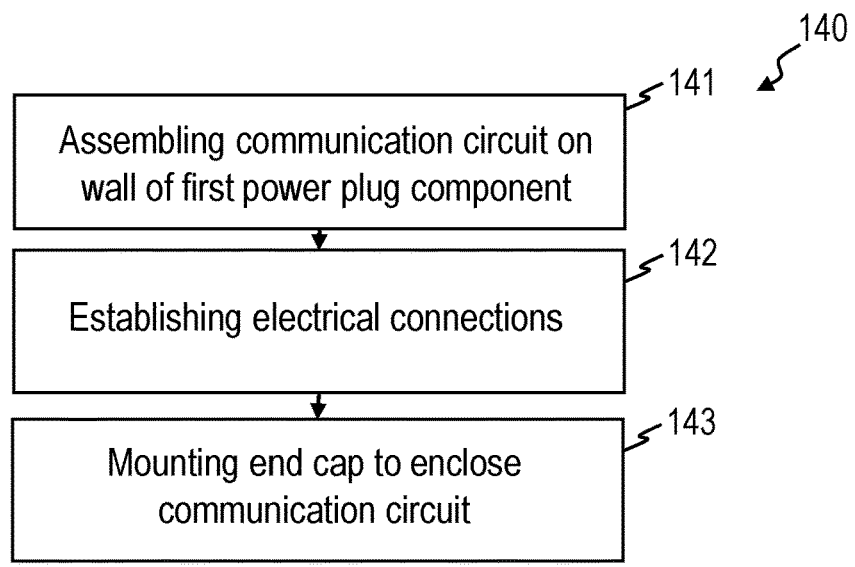
FIG. 11 is a flow chart of a method of manufacturing the power supply device.
Figure 12:
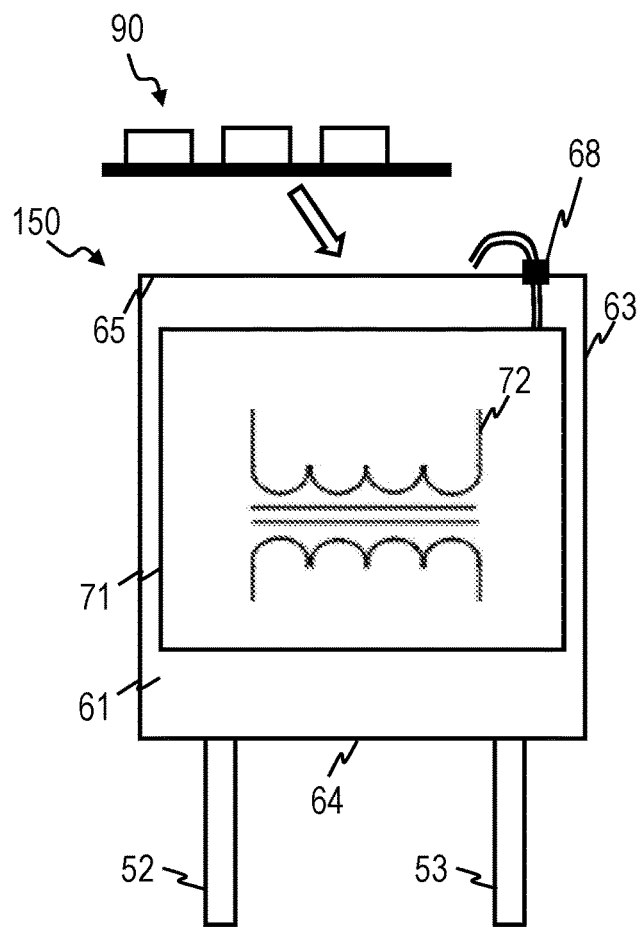
FIGS. 12 to 14 illustrate a method of manufacturing the power supply device.

FIG. 11 is a flow chart of a method 140 of manufacturing a power supply device. Stages of the method are shown in FIGS. 12-14.

At step 141, a communication circuit 90 is assembled on a power plug component 150 having connector pins 52, 53 for engagement with a mains outlet and a first compartment 61. The first compartment 61 houses a converter 71 comprising a converter input and a converter output galvanically separated from the converter input. The first compartment is delimited by a wall 65 that may be arranged opposite to, and spaced from, an end wall 64 from which the connector pins 52, 54 project. A circuit board of the communication circuit 90 may be arranged on and affixed to the wall 65 (FIGS. 12 and 13). The power plug component has an enclosure 63 that is waterproof (e.g., IPX4 or higher).

At step 142, electrical connections may be established. The electrical connections may be established in such a manner that a conductive path is established from the converter output of the converter 71 to a power supply input of the communication circuit 90 and through the communication circuit 90 to a power supply output of the communication circuit 90. Step 142 may comprise connecting conductors passing through a passage in wall 65 to power supply input terminals of the communication circuit (FIG. 13).

Figure 13:
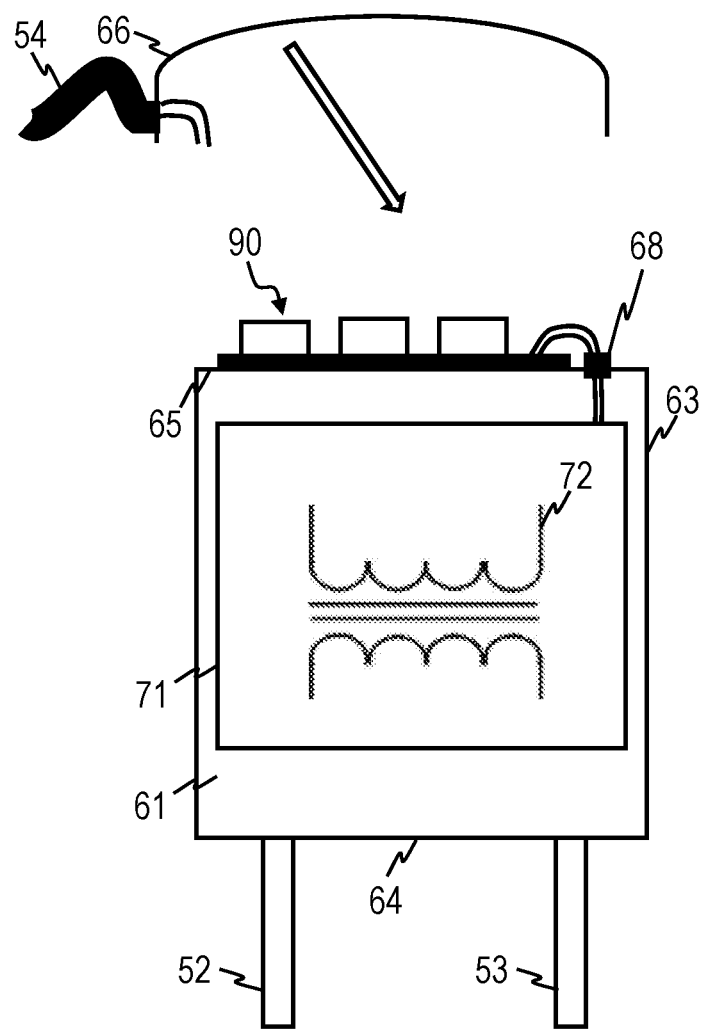
Figure 14:
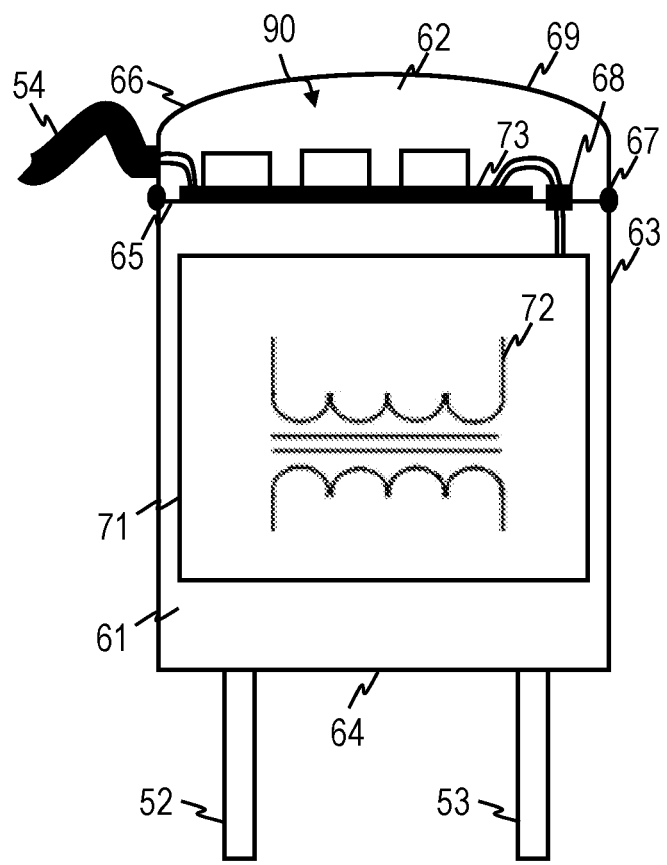

At step 143, an end cap 69 may be mounted so as to enclose the communication circuit 90 (FIGS. 13 and 14). Conductors extending through power supply cable 54 may be electrically connected to the power supply output of the communication circuit 90 (FIG. 14).

The end cap 69 that may be engaged with the enclosure 63, e.g., at the wall 65 or at side walls of the enclosure 63 that extend between the walls 64, 65. The connection between the end cap 69 and the enclosure 63 may but does not need to be waterproof. The attachment of the end cap 69 may be implemented in such a manner that a second compartment 62 defined between the end cap and wall 65 may have an IPX rating (determined in accordance with, e.g., ISO 20653, DIN 40050-9, or IEC 60529) that is less than that of the compartment 61. The end cap 69 may be affixed by an ultrasonic weld 67, adhesive, or other affixing means. The fixation means may extend circumferentially around the entire circumference at which the end cap 69 contacts the enclosure 63.

Various effects and advantages are attained by the invention. The power supply devices, kits, systems, and methods facilitate the transmission of data collected by an appliance, in particular a personal care appliance. The power supply devices, kits, systems, and methods allow appliance-related data to be transmitted over a desired wireless communication standard (such as a member of the IEEE 802.11 standard family) without requiring (while still allowing) the appliance itself to have the required communication circuitry for that specific communication standard. The switched mode power supply charger device can be manufactured in an efficient manner.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A switched mode power supply charger device for charging a rechargeable battery of a personal care appliance, the switched mode power supply charger device comprising:
    a power supply cable having a connector for reversibly releasable engagement with the appliance;
    a power plug configured for engagement with a mains outlet and comprising:
        a housing, the housing comprising a first compartment which is sealed against water ingress and a second compartment adjacent the first compartment;
        wherein the housing comprises a wall separating the first and second compartments, the wall delimiting the second compartment;
        wherein the wall comprises a passage through which at least one conductor extends from an interior of the first compartment into an interior of the second compartment, the passage being sealed against water ingress into the first compartment;
        an AC/DC switched mode converter disposed in the first compartment, the converter comprising a converter input and a converter output galvanically separated from the converter input and electrically connected to the power supply cable; and
        a communication circuit disposed in the second compartment and electrically connected to the converter output, the communication circuit comprising a wireless interface circuit for wireless connection of the switched mode power supply charger device with a wide or local area network.

2. The switched mode power supply charger device of claim 1, wherein the housing comprises an end cap further separating the first and second compartments, the end cap and the wall delimiting the second compartment.

3. The switched mode power supply charger device of claim 1, wherein the power plug comprises a sealing arrangement that seals the passage against water ingress into the first compartment.

4. The switched mode power supply charger device of claim 1, wherein the power plug comprises at least one sheath in which the at least one conductor is received and that is integral with or sealingly attached to the wall.

5. The switched mode power supply charger device of claim 1, wherein the communication circuit comprises a power supply input connected to the at least one conductor.

6. The switched mode power supply charger device of claim 1, wherein the communication circuit comprises a power supply output electrically connected to conductors of the power supply cable.

7. The switched mode power supply charger device of claim 1, wherein the power plug comprises several connector pins for engagement with the mains outlet, each of the several connector pins extending along a first direction, wherein the wall extends transverse to the first direction.

8. The switched mode power supply charger device of claim 1, wherein the switched mode power supply charger device is provided with at least dual functionality as power supply for battery charging and as data hub, collecting and transmitting data.

9. The switched mode power supply charger device of claim 1, wherein the wireless interface circuit is operative to transmit appliance-related data.

10. The switched mode power supply charger device of claim 9, wherein the communication circuit comprises at least one further communication interface circuit different from the wireless interface circuit to collect the appliance-related data.

11. The switched mode power supply charger device of claim 1, wherein the power plug comprises a user interface comprising at least one actuation element operative to cause the communication circuit to enter a configuration mode and/or at least one status indicator operative to output status information related to the communication circuit.

12. The switched mode power supply charger device of claim 1, wherein the first compartment is sealed against water ingress providing a waterproof rating of IPX4, IPX5, IPX6 or greater and/or the second compartment is less sealed against water ingress than the first compartment and is provided with a waterproof rating that is less than that of the first compartment.

13. A kit, comprising:
a personal care appliance; and
the switched mode power supply charger device of any one of the preceding claims, the switched mode power supply charger device being operative to transmit appliance-related data via the wireless interface circuit.

14. The kit of claim 13, wherein the personal care appliance is selected from a group consisting of a hair cutting, trimming or removal appliance and an oral care appliance.

15. A method of manufacturing a switched mode power supply charger device for a personal care appliance, the method comprising:
providing a power plug component having connector pins for engagement with a mains outlet and a first compartment, wherein the first compartment houses a switched mode AC/DC converter comprising a converter input and a converter output galvanically separated from the converter input, the first compartment being delimited by a wall;
arranging a communication circuit on the wall and electrically connecting the communication circuit to the converter output, the communication circuit comprising a wireless interface circuit;
affixing an enclosure for the communication circuit to form a second compartment of a power plug; and
providing a power supply cable affixed to the power plug, the power supply cable having a connector for engagement with the appliance.

16. A use of a switched mode power supply charger device according to claim 1, comprising using the switched mode power supply charger device to provide a communication link over which appliance-related data is transmitted.

17. The switched mode power supply charger device of claim 7, wherein the wall extends perpendicularly to the first direction.

18. The switched mode power supply charger device of claim 9, wherein the appliance-related data comprises appliance operation data or appliance status data.

19. The switched mode power supply charger device of claim 10, wherein the wireless interface circuit defines one wireless interface circuit and the at least one further communication interface circuit comprises a communication circuit operative for collecting the appliance-related data over first and second conductors of the power supply cable used for supplying the appliance with power and/or a further wireless interface circuit different from the one wireless interface circuit.

20. The switched mode power supply charger device of claim 11, wherein the user interface comprises the at least one actuation element and/or the at least one status indicator operative to output status information related to the communication circuit, wherein the at least one status indicator comprises several light segments.

* * * * *